(12) United States Patent
Oshima

(10) Patent No.: US 9,557,904 B2
(45) Date of Patent: Jan. 31, 2017

(54) INFORMATION PROCESSING APPARATUS, METHOD FOR CONTROLLING DISPLAY, AND STORAGE MEDIUM

(71) Applicant: CANON KABUSHIKI KAISHA, Tokyo (JP)

(72) Inventor: Soshi Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 14/361,686

(22) PCT Filed: Nov. 26, 2012

(86) PCT No.: PCT/JP2012/007553
§ 371 (c)(1),
(2) Date: May 29, 2014

(87) PCT Pub. No.: WO2013/080510
PCT Pub. Date: Jun. 6, 2013

(65) Prior Publication Data
US 2014/0359526 A1    Dec. 4, 2014

(30) Foreign Application Priority Data

Nov. 30, 2011  (JP) ................................ 2011-261839

(51) Int. Cl.
*G06F 3/0484* (2013.01)
*G06F 3/0488* (2013.01)
*G06F 3/01* (2006.01)

(52) U.S. Cl.
CPC .......... *G06F 3/04845* (2013.01); *G06F 3/017* (2013.01); *G06F 3/0488* (2013.01); *G06F 3/04842* (2013.01); *G06F 3/04883* (2013.01); *G06F 2203/04806* (2013.01); *G06F 2203/04808* (2013.01)

(58) Field of Classification Search
CPC .. G06F 3/04845; G06F 3/017; G06F 3/04842; G06F 3/0488; G06F 3/04883
See application file for complete search history.

(56) References Cited

U.S. PATENT DOCUMENTS

| | | | |
|---|---|---|---|
| 6,898,523 B2 * | 5/2005 | Cochlovius | ........ G01C 21/3614 345/156 |
| 2007/0038955 A1 * | 2/2007 | Nguyen | ................ G06F 3/0481 715/804 |
| 2008/0163130 A1 * | 7/2008 | Westerman | ......... G06F 3/04883 715/863 |

(Continued)

FOREIGN PATENT DOCUMENTS

| | | |
|---|---|---|
| JP | 11-177804 A | 7/1999 |
| JP | 2001-290585 | 10/2001 |

(Continued)

*Primary Examiner* — Jeffrey A Gaffin
*Assistant Examiner* — Subrata Paul
(74) *Attorney, Agent, or Firm* — Canon U.S.A., Inc. IP Division

(57) ABSTRACT

When an information processing apparatus detects an operation in which three different points on a displayed image are touched and, while fixing one of the three points, the remaining two points are moved, the information processing apparatus displays side by side the image enlarged or reduced in response to the movement of the two points and the image neither enlarged nor reduced.

12 Claims, 30 Drawing Sheets

(56) References Cited

U.S. PATENT DOCUMENTS

| | | | | |
|---|---|---|---|---|
| 2008/0168403 A1* | 7/2008 | Westerman | G06F 3/04883 | 715/863 |
| 2009/0031247 A1* | 1/2009 | Walter | G06F 9/4443 | 715/788 |
| 2011/0107209 A1* | 5/2011 | Ha | G06F 3/0488 | 715/702 |
| 2011/0115820 A1* | 5/2011 | Kasahara | G06F 3/0414 | 345/650 |
| 2011/0157014 A1* | 6/2011 | Hachiya | G06F 3/03547 | 345/157 |
| 2011/0205171 A1* | 8/2011 | Akiyoshi | G06F 3/04883 | 345/173 |
| 2012/0306928 A1* | 12/2012 | Yoshinaka | G06F 3/04883 | 345/660 |

FOREIGN PATENT DOCUMENTS

| | | |
|---|---|---|
| JP | 2010-122444 A | 6/2010 |
| JP | 2011-170796 A | 9/2011 |

* cited by examiner

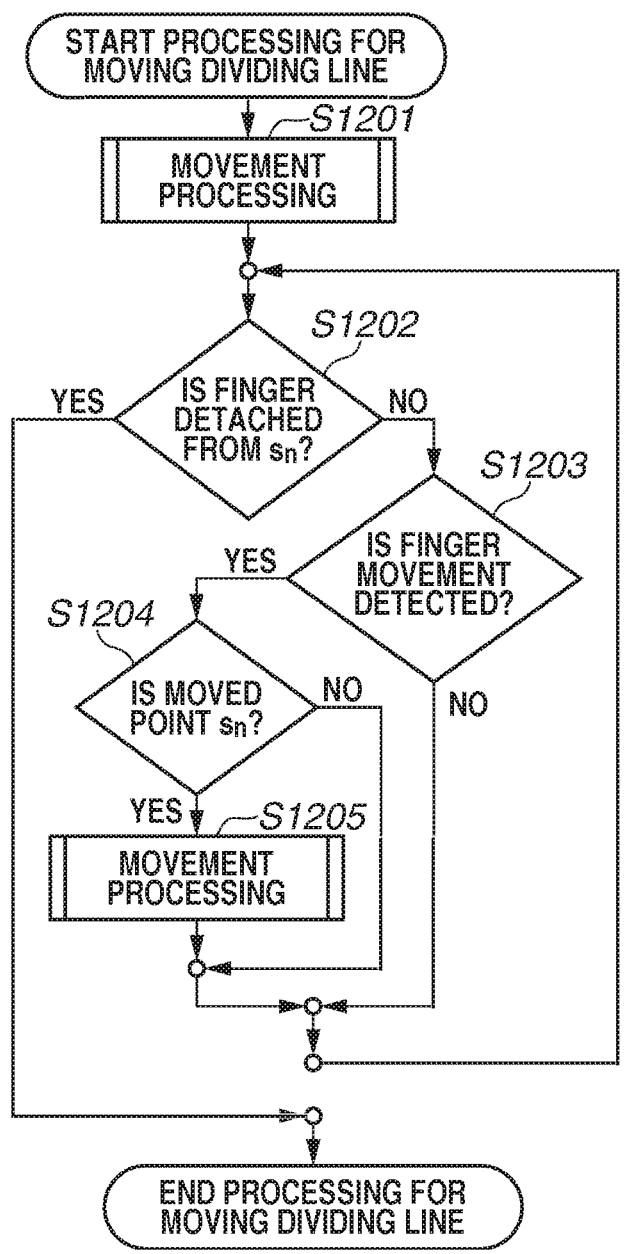

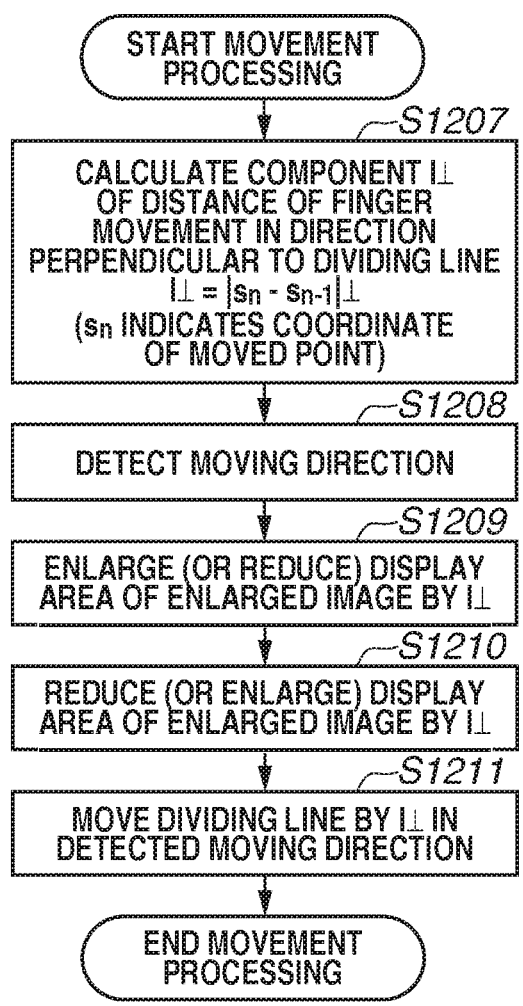

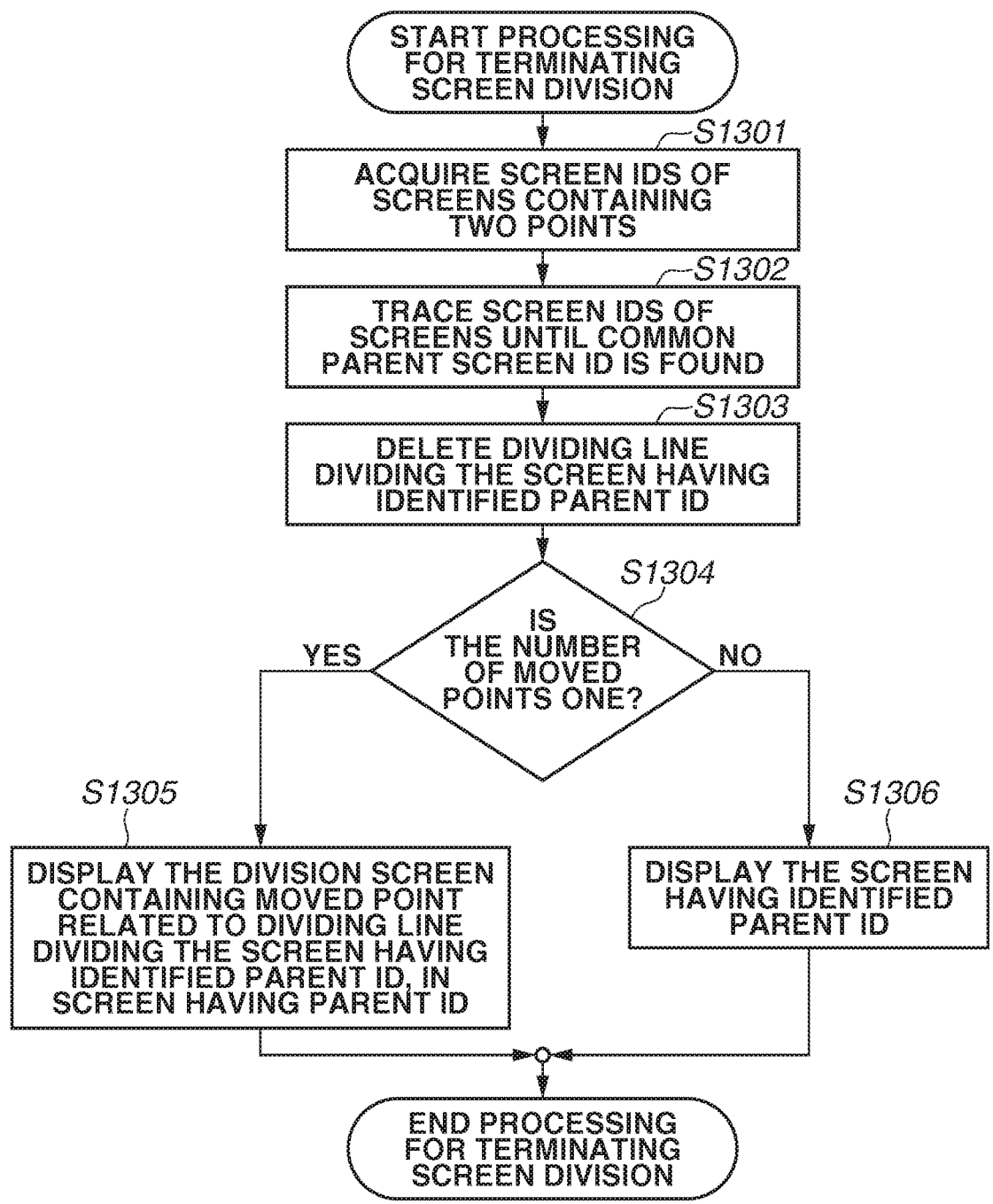

INFORMATION PROCESSING APPARATUS, METHOD FOR CONTROLLING DISPLAY, AND STORAGE MEDIUM

CROSS REFERENCE TO RELATED APPLICATIONS

This application is a National Stage filing of International Application No. PCT/JP2012/007553 filed Nov. 26, 2012, which claims the benefit of priority from Japanese Patent Application No. 2011-261839 filed Nov. 30, 2011, the disclosures of each of which are hereby incorporated by reference herein in their entirety.

TECHNICAL FIELD

The present invention relates to an information processing apparatus having a touch panel, a method for controlling an image displayed on a display unit of the information processing apparatus, and a program therefor.

BACKGROUND ART

In recent years, apparatuses having a touch panel on their display unit for displaying an image have been generally used. Such apparatuses are known to enlarge a display image through touch panel operations such as opening two fingers held in contact with the touch panel (a pinch-out operation), or quickly tapping twice (a double-tap operation).

However, when a user enlarges a part of an image displayed on the touch panel, an edge portion of the image disappears from the display area. Therefore, if the user wants to see again the portion of the image which has once disappeared from the display area, the user needs to perform operations such as reducing the enlarged image to the original size, or sliding the enlarged image to display the target portion of the image.

To improve the convenience of such operations, a technique for switching between an enlarged image and an original size image by inputting a user's gesture to a touch panel has been devised (refer to Japanese Patent Application Laid-Open No. 2010-122444).

According to the above-described conventional technique, although troublesome required operations have been reduced to a certain extent, it is not possible to show the user both the enlarged image and the original size image (an image portion the user wants to see) at the same time.

CITATION LIST

Patent Literature

PTL 1: Japanese Patent Application Laid-Open No. 2010-122444

SUMMARY OF INVENTION

The present invention is directed to improving the operability of an apparatus having a touch panel.

According to an aspect of the present invention, an information processing apparatus includes a display unit configured to display an image; a touch panel configured to detect a touch of at least three points; a detection unit configured to detect an operation in which three different points on the image displayed on the display unit are touched and, while fixing one of the three points, a pinch-out is performed with the remaining two points; and a display control unit configured to, in response to the detection by the detection unit, display on the display unit a first display image which is an enlarged partial image of the image including at least the center of the pinch-out, and a second display image which is an unenlarged partial image of the image including at least the one fixed point, wherein the display control unit displays side by side the first display image and the second display image.

According to another aspect of the present invention, an information processing apparatus includes a display unit configured to display an image; a touch panel configured to detect a touch; a detection unit configured to detect an operation in which, while fixing one touched point on the image displayed on the display unit, a touch for enlarging the image is performed; a division unit configured to, in response to the detection by the detection unit, divide a display screen of the display unit displaying the image into a first screen and a second screen; and a display control unit configured to display in the first screen a first image enlarged in response to the touch for enlarging the image, and to display in the second screen a second image which is an unenlarged image including at least the one fixed point.

According to the present invention, the operability of an apparatus having a touch panel is improved to a further extent.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 12A is a flowchart illustrating the processing for moving a dividing line.

FIG. 12B is a flowchart illustrating the processing for moving a dividing line.

FIG. 13 is a flowchart illustrating processing for ending screen division.

DESCRIPTION OF EMBODIMENTS

Various exemplary embodiments, features, and aspects of the invention will be described in detail below with reference to the drawings.

A first exemplary embodiment will be described below centering on processing for an image displayed on an information processing apparatus having a touch panel.

Figure 1:
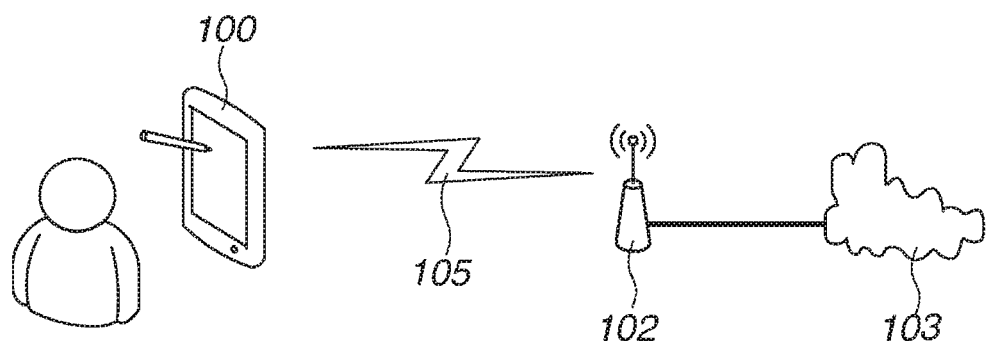
FIG. 1 is a schematic view illustrating an operating environment of an information processing apparatus having a touch panel.

FIG. 1 illustrates an example of operating environment of the information processing apparatus having a touch panel according to the present exemplary embodiment. FIG. 1 illustrates a state where an information processing apparatus 100 is connected to the Internet 103 via a wireless local area network (LAN) connection 105 using a wireless LAN access point 102. The information processing apparatus 100 is capable of displaying as a display image an image generated by any application software included in the information processing apparatus 100. Alternatively, the information processing apparatus 100 is capable of displaying as a display image an image generated based on any content data acquired via the Internet 103.

Figure 2:
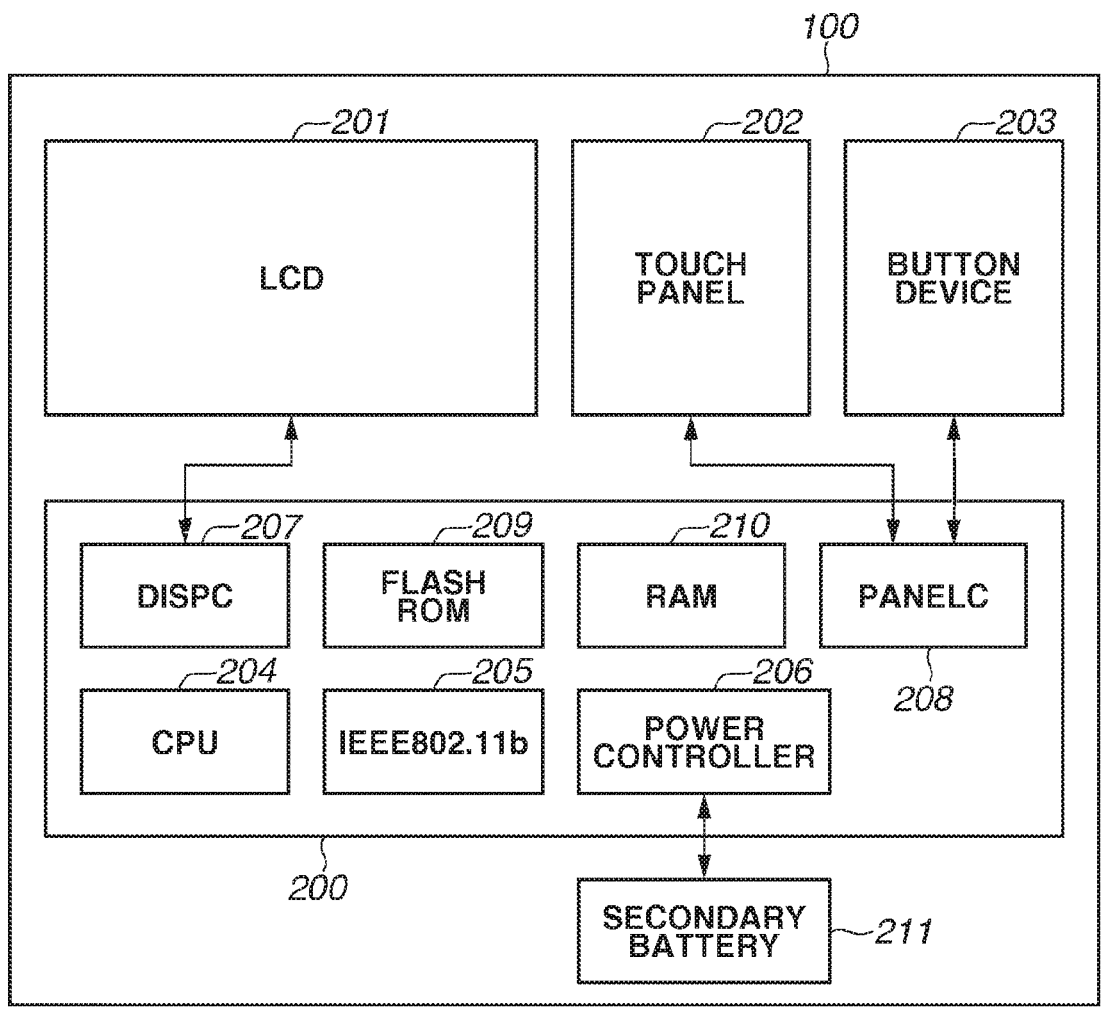
FIG. 2 is illustrates a hardware configuration of the information processing apparatus.

FIG. 2 is a block diagram illustrating a hardware configuration of the information processing apparatus 100 having a touch panel. Hardware modules included in the information processing apparatus 100 will be described below.

The information processing apparatus 100 mainly includes a main board (controller board) 200, a liquid crystal display (LCD) 201, a touch panel 202, and a button device 203.

The main board 200 mainly includes a central processing unit (CPU) 204, an IEEE802.11b module 205, a power controller 206, a display controller 207, a panel controller 208, a FLASH read-only memory (ROM) 209, and a random access memory (RAM) 210. These hardware modules 204 to 210 are connected with each other via a bus (not illustrated).

The CPU 204 totally controls each hardware module connected to the bus, and executes a firmware module (a control program) stored in the FLASH ROM 209. The RAM 210 functions as a main memory and a work area for the CPU 204, and a memory for storing video image to be displayed on the LCD 201.

A display controller (DISPC) 207 transfers to the LCD 201 a video image loaded into the RAM 210, and performs display control of the LCD 201 in response to a request from the CPU 204. As a result, the video image is displayed on the LCD 201.

A panel controller (PANELC) 208 controls the touch panel 202 and the button device 203 in response to a request from the CPU 204. With this control, a pressing position of a pointing object such as a position pressed with a finger or a stylus pen on the touch panel 202, and a key code of a pressed key on the button device 203 are returned to the CPU 204. Pressing position information includes a coordinate value (hereinafter referred to as x coordinate) indicating an absolute position of the touch panel 202 in the horizontal direction, and a coordinate value (hereinafter referred to as y coordinates) indicating an absolute position thereof in the vertical direction. The touch panel 202 according to the present exemplary embodiment is capable of detecting the pressing of a plurality of points (at least three points). In this case, pieces of position information for the number of pressed points is returned to the CPU 204.

The touch panel 202 is integrally configured with the LCD 201. For example, the touch panel 202 is configured so that the transmittance of light may not disturb display of the LCD 201, and attached to an upper layer of the display surface of the LCD 201. An input coordinate on the touch panel 202 is associated with a display coordinate on the LCD 201. Thus, a graphical user interface (GUI) is configured such that the user looks capable of directly operating a screen displayed on the LCD 201. The LCD 201 is not limited to a LCD, and may be a display apparatus employing any display method.

The power controller 206 is connected with an external power supply (not illustrated) to receive the power. The power controller 206 supplies the power to the entire information processing apparatus 100 while charging a secondary battery 211 connected to the power controller 206. If the power is not supplied from the external power supply, the power controller 206 supplies the power to the information processing apparatus 100 from the secondary battery 211.

Under control of the CPU 204, the IEEE802.11b module 205 establishes wireless communication with an IEEE802.11b module on other instruments, such as an image forming apparatus (such as a printer), a projector, and a digital camera, to serve as an intermediate of communication with the information processing apparatus 100.

The hardware configuration illustrated in FIG. 2 is only an example, and any other hardware modules may be provided. For example, a global positioning system (GPS) and various sensors, such an acceleration sensor, a gyro sensor, and an electronic compass may be provided.

The CPU 204 according to the present exemplary embodiment is capable of detecting, for example, the following operations and states on the touch panel 202: touching the touch panel 202 with a finger or pen (hereinafter referred to as as "touch-down"), a state where a finger or pen is in contact with the touch panel 202 (hereinafter referred to as "touch-on"), moving a finger or pen being held in contact with the touch panel 202 (hereinafter referred to as "move"), detaching a finger or pen from the touch panel 202 (hereinafter referred to as "touch-up"), and a state where neither a finger nor a pen is in contact with the touch panel 202 (hereinafter referred to as "touch-off").

The above-described operations and coordinates of positions at which a finger or pen contacts the touch panel 202 are notified to the CPU 204 via a bus (not illustrated). The CPU 204 determines what operation has been performed on the touch panel 202 based on the notified information. With respect to a move operation, the moving direction of a finger or pen moving on the touch panel 202 can be determined for each of the vertical and horizontal components on the touch panel 202 based on a change in position coordinate.

When the user performs a touch-down, movement over a certain distance, and a touch-up in this order on the touch panel 202, it is assumed that a stroke has been drawn. An operation of quickly drawing a stroke is referred to as flick. Specifically, a flick is an operation in which the user quickly moves a finger held in contact with the touch panel 202 over a certain distance and then detach the finger therefrom, in other words, the user quickly sweeps (or obliquely flips) the surface of the touch panel 202 with a finger. When the CPU 204 detects a move operation over a predetermined distance or more at a predetermined speed or more and then detects a touch-up operation, the CPU 204 determines that a flick operation has been made.

When the CPU 204 detects a move operation over a predetermined distance or more and then detects a touch-on state, the CPU 204 determines that a drag operation has been made. Further, opening two fingers (two pointing objects) for enlargement is referred to as pinch-out, and closing two fingers (two pointing objects) for reduction is referred to as pinch-in. These operations can also be determined by the CPU 204. The touch panel 202 may be of the resistive film type, capacitance type, surface acoustic wave type, infrared type, electromagnetic induction type, image recognition type, optical sensor type, and other types.

Figure 10:
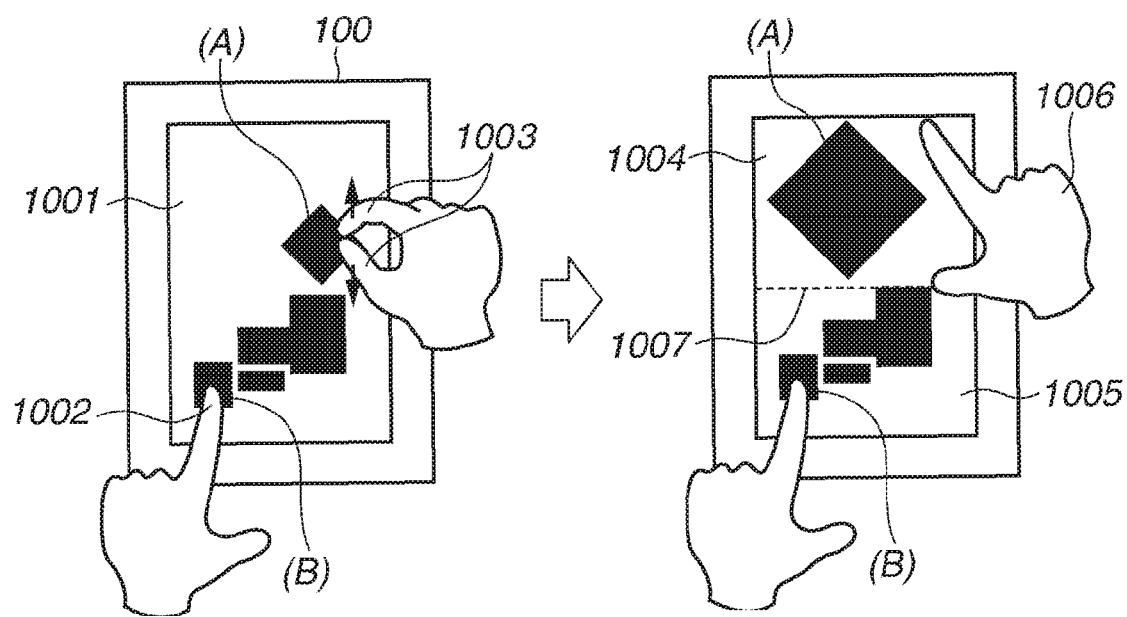
FIG. 10 illustrates an example of an operation achieved in a first exemplary embodiment.

FIG. 10 illustrates an example of an operation achieved in the present exemplary embodiment.

FIG. 10 schematically illustrates a state where the screen is divided into two and an enlarged image is displayed on one of the division screens.

Referring to FIG. 10, for example, an image of a Japanese map is displayed in a display screen 1001 of the information processing apparatus 100. In this case, the user wants to enlarge a portion (A) while maintaining the display of the vicinity of a portion (B) in the image is maintained as it is.

To point a portion to be maintained as it is, the user touches on the vicinity of the portion (B) with a finger 1002. Then, to enlarge the portion (A), the user performs a pinch-out with two fingers on the portion (A) (opens them from a closed state 1003 to an open state 1006). Then, the display screen 1001 is divided into two (top and bottom screens) by a dividing line 1007, and an enlarged image of the portion (A) is displayed in the top division screen and an image of the vicinity of the portion (B) is displayed in the bottom division screen in the same size. The enlarged image of the portion (A) is displayed centering on the center of a pinch-out operation. The center of a pinch-out operation refers to a midpoint of a line segment connecting two contact points of the two fingers which performed a pinch-out on the touch panel 202.

In the following descriptions, out of division images, an image enlarged by a pinch-out operation (corresponding to an image 1004 illustrated in FIG. 10) is referred to as an enlarged image, and an image held in the touch-on state (corresponding to an image 1005 illustrated in FIG. 10) is referred to as a reference image. The enlarged image is an example of a first display image, and the reference image is an example of a second display image. The screen displaying the enlarged image is an example of a first screen, and the screen displaying the reference image is an example of a second screen.

Division and enlargement processing performed by the information processing apparatus 100 according to the present exemplary embodiment will be described in detail below with reference to FIGS. 3 to 18A to 18D. Each step of flowcharts described below according to the present exemplary embodiment is implemented when the CPU 204 (hardware module) executes a program (software) stored in the ROM 209 of the information processing apparatus 100. However, instead of implementing all processing by software, dedicated hardware modules executing similar processing or a part thereof may be used to implement the processing of the present exemplary embodiment. Although, in the present exemplary embodiment, a pinch-out operation is used as an enlarging operation, the enlarging operation is not limited thereto, and may be other operations such as double-tap (quickly tapping (touching down) the touch panel 202 twice) and may be other operations (gestures).

Figure 3:
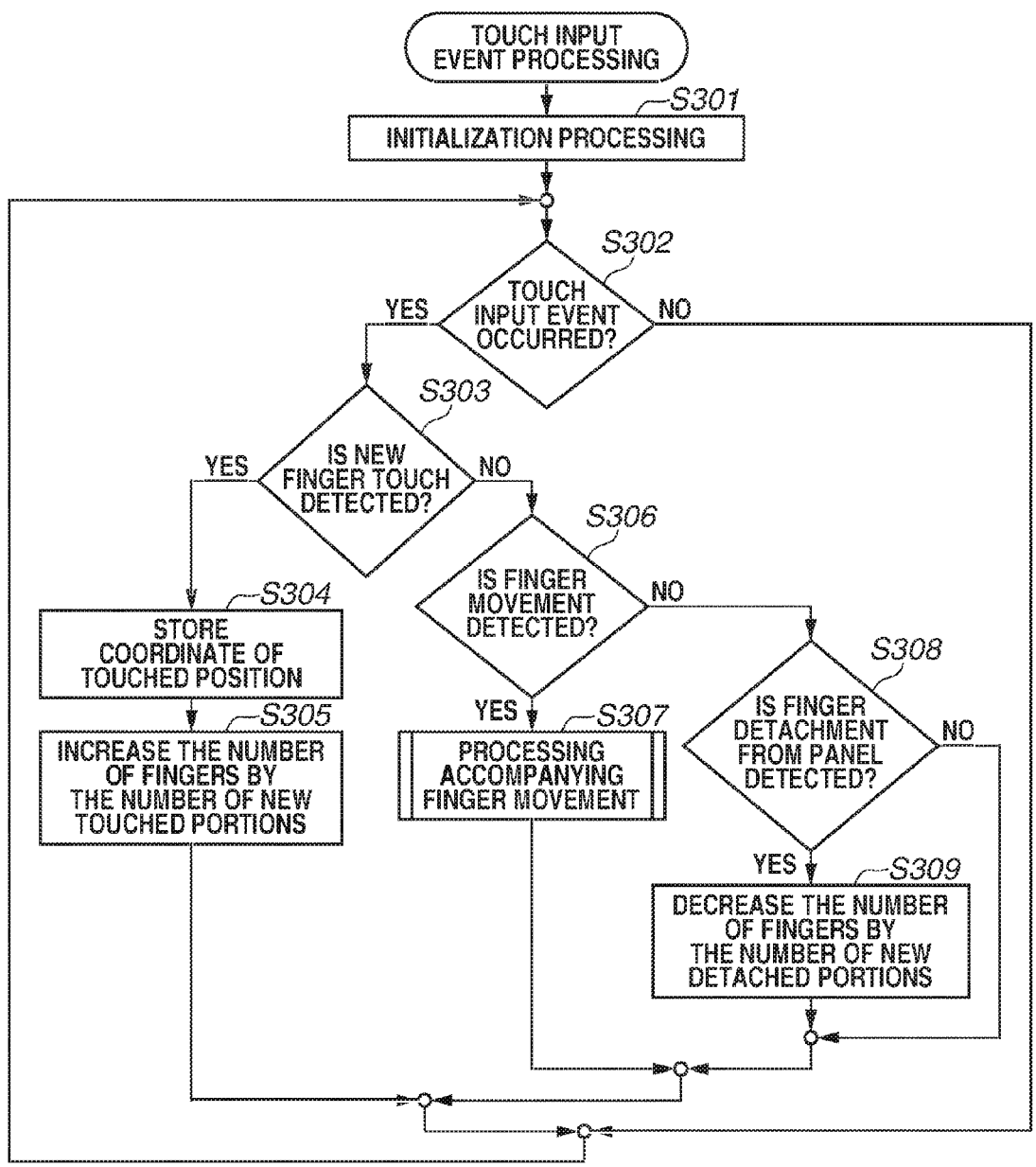
FIG. 3 is a flowchart illustrating processing performed when a touch input event occurs.

FIG. 3 is a flowchart illustrating processing performed by the information processing apparatus 100 when an event related to a touch input (hereinafter referred to as a touch input event) occurs. This flowchart is executed when an application requiring division and enlargement processing is activated, and repeated until the application is terminated. Although, in this example, the user touches the touch panel 202 by using fingers, a stylus pen may also be used.

In step S301, the CPU 204 initializes information about the number of fingers touching the touch panel 202 (the number of portions at which touch-on is detected) and coordinate information indicating positions of these portions. Since these pieces of information are stored in the RAM 210, the CPU 204 initializes them in the RAM 210 in step S301. The coordinate information includes the above-described x and y coordinates. In the following descriptions, the coordinate information is represented by a notation "$p_n$" where the subscript n indicates the present. A notation "$p_{n-m}$" indicates coordinate information stored when an event occurred m times before. Coordinate information for a predetermined number of events which have occurred is stored in the RAM 210.

In step S302, the CPU 204 determines whether a touch input event occurs. A touch input event is generated by the PANELC 208 when it detects that a user's finger touches the touch panel 202 (touch-down), moves thereon (move), or is detached therefrom (touch-up). When a touch input event has occurred (YES in step S302), the processing proceeds to step S303. Otherwise (NO in step S302), the processing returns to step 302 and the CPU 204 waits for the occurrence of a touch input event.

In step S303, the CPU 204 determines whether the touch input event has occurred due to a new finger touch (touch-down). Information indicating whether the event has occurred due to a new finger touch (information indicating touch-down), is attached to the touch input event. When the touch input event of the touch-down occurs (YES in step S303), the processing proceeds to step S304. Otherwise (NO in step S303), the processing proceeds to step S306.

In step S304, the CPU 204 stores in the RAM 210 coordinate information for a position at which the touch-down is detected. The coordinate information for the position at which the touch-down is detected is included in the touch input event. At this timing, the CPU 204 updates the coordinate information already stored in the RAM 210, updates the subscript n to become the current value, and stores the coordinate information in the RAM 210.

In step S305, the CPU 204 increases the number of fingers touching the touch panel 202 (the number of portions at which touch-on is detected) by a number of detected portions of touch-down. This information is stored in the RAM 210 as described above.

In step S306, the CPU 204 determines whether the touch input event has occurred due to finger movement (move). Information indicating whether the event has occurred due to finger movement (information indicating move) is attached to the touch input event. When the touch input event which has occurred is move (YES in step S306), the processing proceeds to step S307. Otherwise (NO in step S306), the processing proceeds to step S308.

In step S307, the CPU 204 executes processing accompanying finger movement. This processing will be described below with reference to FIG. 4.

In step S308, the CPU 204 determines whether the touch input event has occurred due to finger detachment from the touch panel 202 (touch-up). Information indicating whether the event has occurred due to finger detachment from the touch panel 202 (information indicating touch-up) is attached to the touch input event. When the touch input event which has occurred is a touch-up (YES in step S308), the processing proceeds to step S309. Otherwise (NO in step S308), the processing returns to step S302 and the CPU 204 waits for the occurrence of a touch input event.

In step S309, the CPU 204 decreases the number of fingers touching the touch panel 202 (the number of portions at which touch-on is detected) stored in the RAM 210, by a number of detected portions of touch-up.

Upon completion of processing of steps S305, S307, and S309, the processing returns to step S302 and the CPU 204 waits for the occurrence of a touch input event.

Figure 4:
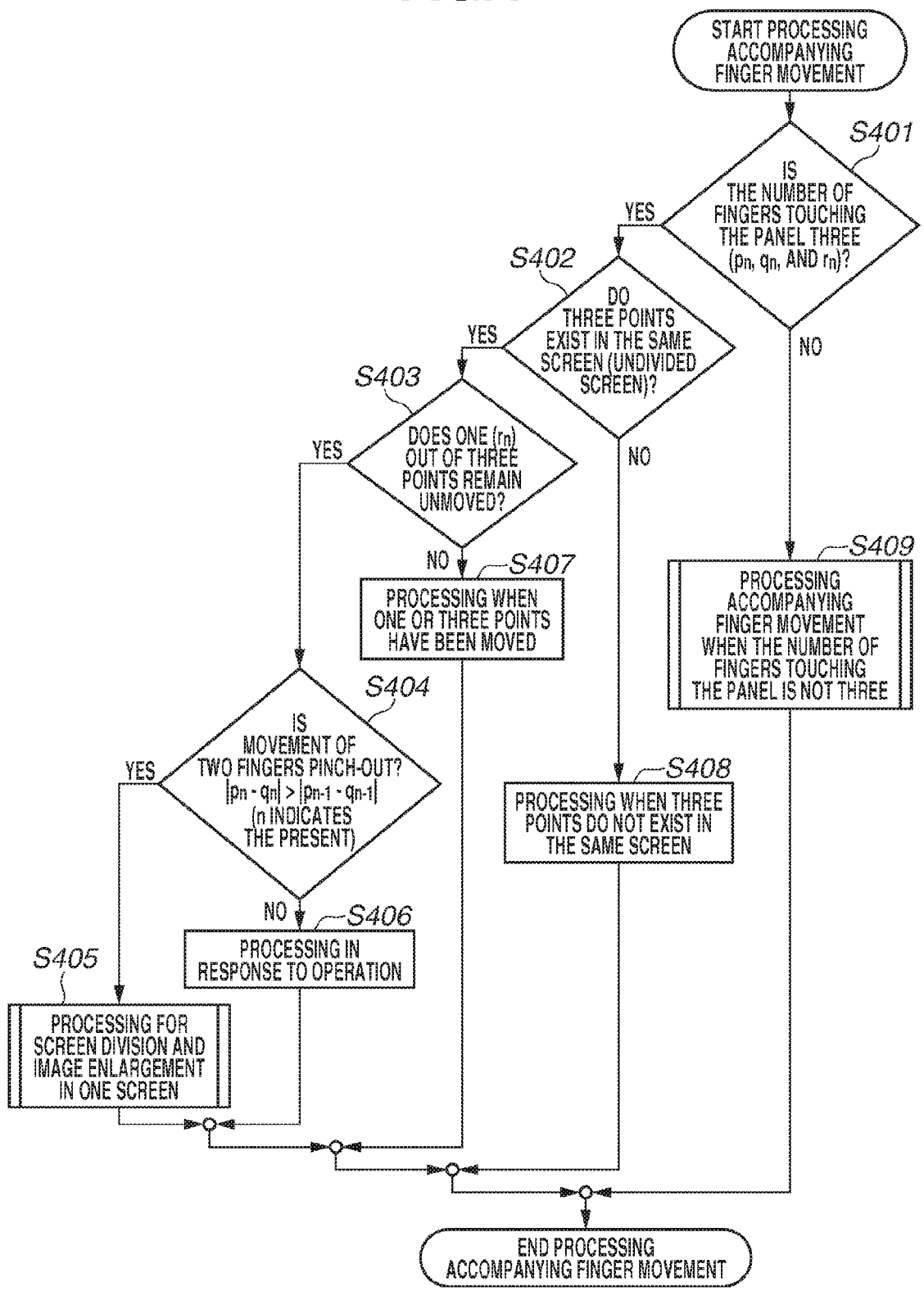
FIG. 4 is a flowchart illustrating processing performed when the touch input event is a finger movement.

FIG. 4 is a flowchart illustrating processing performed by the information processing apparatus 100 when the touch input event has occurred due to finger movement (move). This flowchart is executed in step S307 of the flowchart illustrated in FIG. 3.

In step S401, the CPU 204 acquires the number of fingers currently touching the touch panel 202 (the number of portions at which touch-on is detected) from the RAM 210, and determines the number of fingers touching the touch panel 202 is three. When the number of fingers touching the touch panel 202 is three (YES in step S401), the processing proceeds to step S402. Otherwise (NO in step S401), the processing proceeds to step S409. Coordinate information when the number of fingers touching the touch panel 202 is three is defined as $p_n$, $q_n$, and $r_n$.

In step S402, the CPU 204 determines whether the three points ($p_n$, $q_n$, and $r_n$) exist in the same screen. When the three points exist in the same screen (YES in step S402), the processing proceeds to step S403. Otherwise (NO in step S402), the processing proceeds to step S408. The same screen refers to one screen which is not divided by a dividing line (described below). The CPU 204 is capable of determining whether the three points ($p_n$, $q_n$, and $r_n$) exist in the same screen based on the coordinate information for the three points ($p_n$, $q_n$, and $r_n$) stored in the RAM 210 and information about screen IDs (described below).

In step S403, the CPU 204 determines whether only one out of the three points remains unmoved, i.e., whether two out of the three points have been moved. When only one out of the three points remains unmoved (YES in step S403), the processing proceeds to step S404. Otherwise (NO in step S403), the processing proceeds to step S407. In the following descriptions, when only one out of the three points remains unmoved, coordinate information for the one point is indicated by $r_n$. The coordinate information $r_n$ corresponds to a contact point of the finger 1002 pointing the reference image described with reference to FIG. 10.

In step S404, the CPU 204 determines whether the movement of two fingers, i.e., whether the movement of the points $p_n$ and $q_n$, is a pinch-out. When the movement is a pinch-out (YES in step S404), the processing proceeds to step S405. Otherwise (NO in step S404), the processing moves to step S406. To determine whether the movement is a pinch-out, it is necessary to check whether the distance between the two points ($p_n$, $q_n$) changes before and after the event by using the following formula (1).

$$|p_n - q_n| > |p_{n-1} - q_{n-1}| (n \text{ indicates the present}) \quad (1)$$

where ($p_{n-1}$, $q_{n-1}$) indicates coordinate information for the two points before the event, and is stored in the RAM 210.

In step S405, the CPU 204 executes processing for dividing the screen into two and displaying an enlarged image in one of the two division screens. This processing will be described below with reference to the flowcharts illustrated in FIGS. 5A to 5D.

In step S406, the CPU 204 executes predetermined processing in response to operations of the movement of two fingers other than the pinch-out operation. Detailed descriptions about predetermined processing will be omitted. However, when a pinch-in is performed, the CPU 204 may execute reverse processing of step S405, i.e., processing for dividing the screen into two and displaying a reduced image in one of the two division screens.

In step S407, the CPU 204 executes processing for a case where one or three out of the three points have been moved. Since processing in this case is not directly related to the present invention, detailed descriptions will be omitted.

In step S408, the CPU 204 executes processing for a case where three points do not exist in the same screen. In this case, the CPU 204 may execute processing for a case where one or two points are touched in respective screens, or execute no operation. Since processing in this case is not directly related to the present invention, detailed descriptions will be omitted.

In step S409, the CPU 204 executes processing accompanying finger movement in a case where the number of fingers touching the touch panel 202 is not three, i.e., when the number of fingers touching the touch panel 202 is one, two, four, or more. This processing will be described in details below with reference to FIG. 11.

FIGS. 5A to 5D are flowcharts illustrating processing performed by the information processing apparatus 100 to divide the screen into two and display an enlarged image in one of the two division screens. This flowchart is executed in step S405 of the flowchart illustrated in FIG. 4.

Figure 5A:
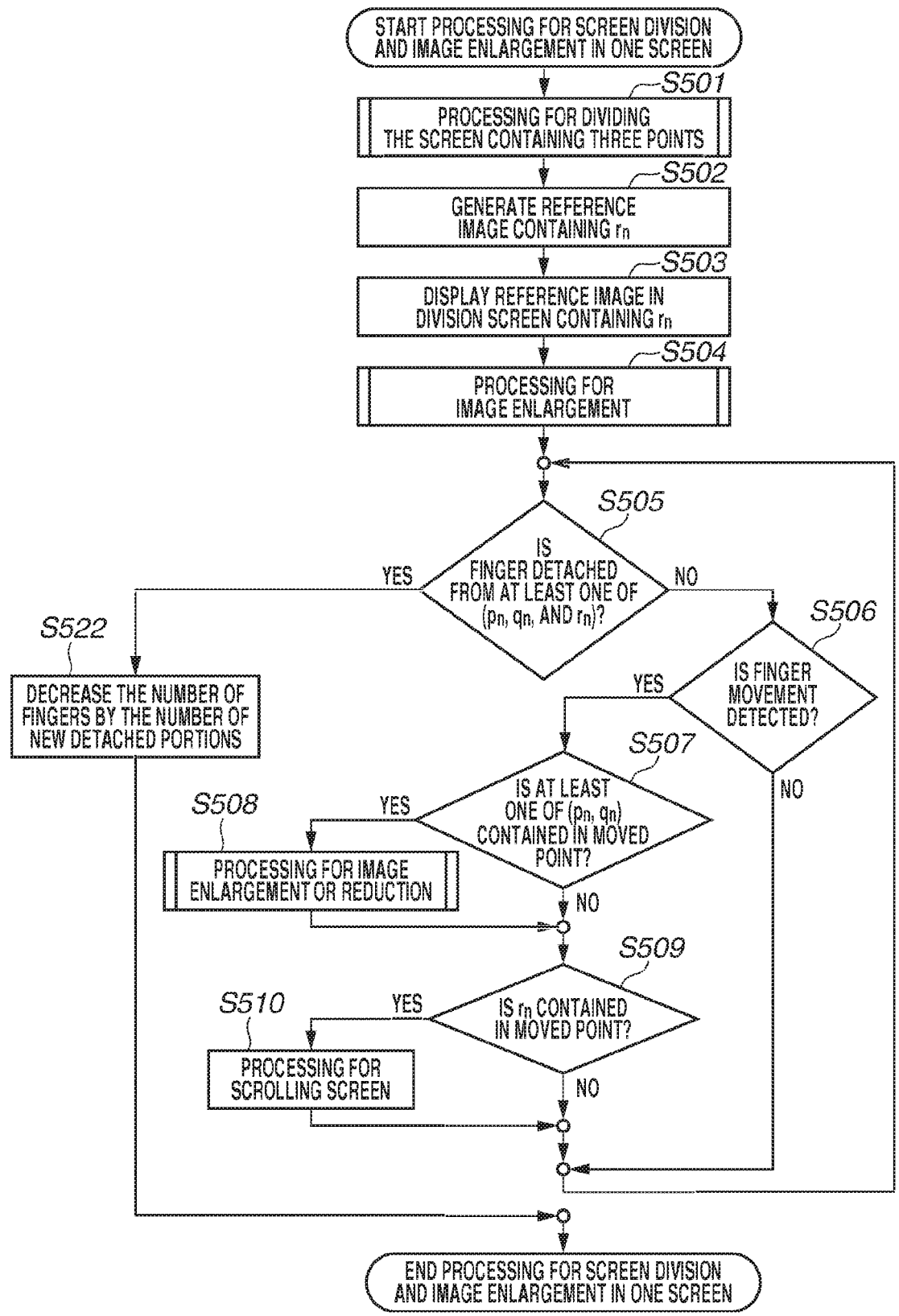
FIG. 5A is a flowchart illustrating the processing for dividing the screen into two and displaying an enlarged image on one of the two screens.
Figure 5B:
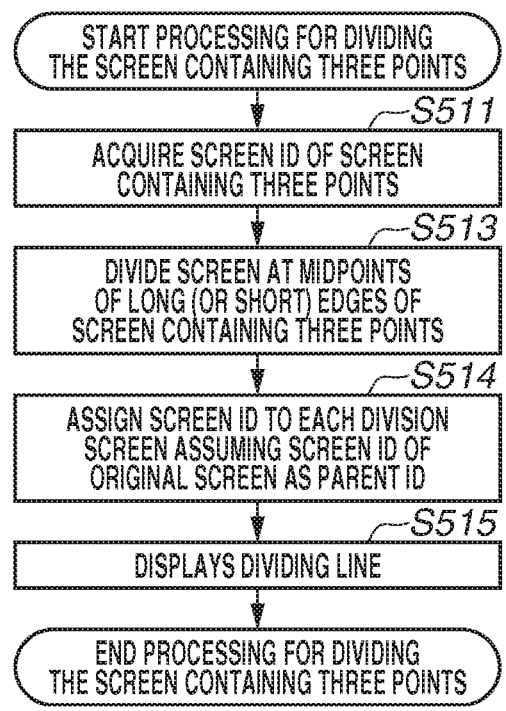
FIG. 5B is a flowchart illustrating the processing for dividing the screen into two and displaying an enlarged image on one of the two screens.
Figure 5C:
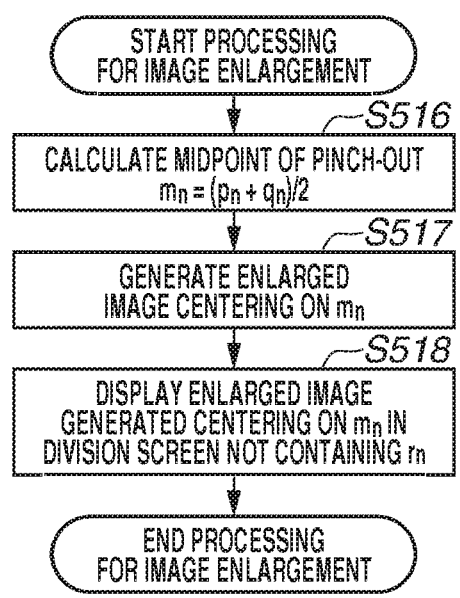
FIG. 5C is a flowchart illustrating the processing for dividing the screen into two and displaying an enlarged image on one of the two screens.

In step S501, the CPU 204 executes processing for dividing a screen containing the three points ($p_n$, $q_n$, and $r_n$). FIG. 5B is a flowchart illustrating processing for dividing the screen containing the three points.

In step S511, the CPU 204 acquires from the RAM 210 a screen ID of the screen containing the three points.

Screen ID and dividing lines will be described below with reference to FIGS. 8 and 9.

Display screen division is performed in the present exemplary embodiment. Each screen before and after the screen division is given a unique screen ID. Each screen is divided by a dividing line. Dividing lines 801 to 804 are illustrated in FIG. 8. Dividing lines 805 to 813 illustrate how a screen ID is sequentially assigned to each division screen. For example, when a screen 805 having a screen ID 0 is divided into two, a dividing line 801 is displayed so that it passes midpoints of long edges of the screen 805 having the screen ID 0. As a result, the screen 805 is divided into a screen 806 having a screen ID 1 and a screen 807 having a screen ID 2. In this case, the screen ID 0 is managed as a parent ID of the screen ID 1 and the screen ID 2. Each of the screens given a screen ID is managed as a single screen on a screen ID basis, and can be further divided. For example, assuming that the screen ID 1 is a parent ID, the screen 806 having the screen ID 1 can be divided into a screen 808 having a screen ID 3 and a screen 809 having a screen ID 4.

Figure 8:
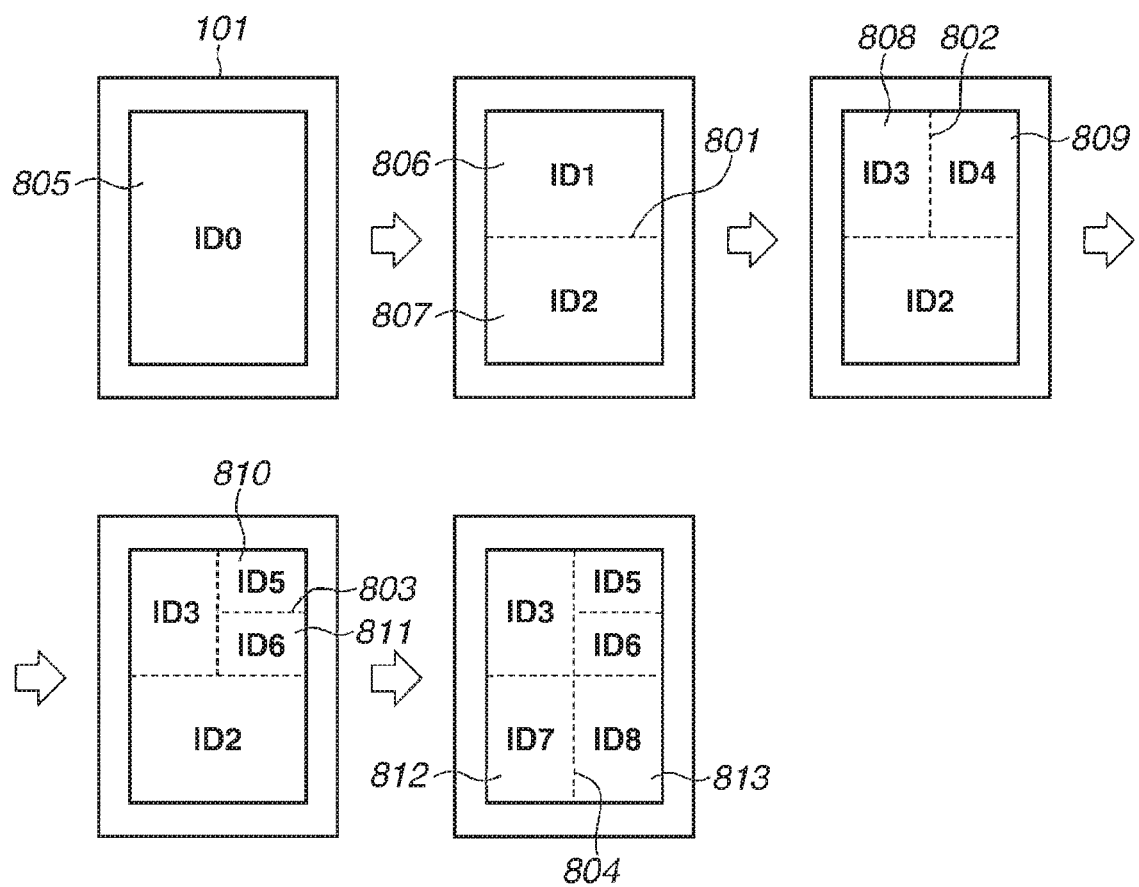
FIG. 8 illustrates an example of assignment of dividing lines and screen identifiers (IDs).
Figure 9:
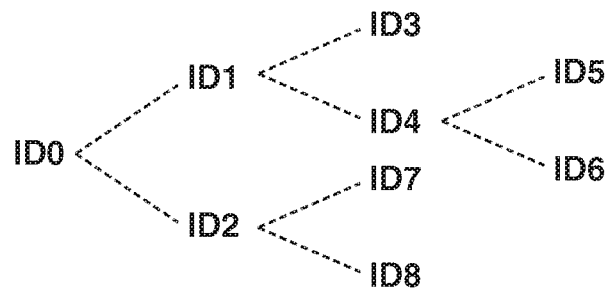
FIG. 9 illustrates an example of a binary tree for managing screen IDs.

The screen ID child-parent relation is managed as a binary tree structure as illustrated in FIG. 9, and relevant data is stored in the RAM 210. The binary tree illustrated in FIG. 9 corresponds to an example of screen division illustrated in FIG. 8.

In the example illustrated in FIG. 8, it is defined that screen division is performed at midpoints of long edges. In addition, if the screen orientation (vertical or horizontal) can be known by using an acceleration sensor, it is possible to certainly perform screen division either in the vertical direction or at midpoints of short edges. Further, it is also possible to manage the dividing direction based on a plurality of division modes such as a mode in which screen division is performed at midpoints of long edges, a mode in which screen division is performed at midpoints of short edges, and a mode in which an acceleration sensor is used in the dividing direction, and to allow the user to select a desired division mode. Further, the above-described processing is only an example, and the processing is not limited to screen division at midpoints.

The flowchart illustrated in FIG. 5B will be described below again. In step S513, the CPU 204 divides the screen at midpoints of long edges (or short edges) of the screen containing the three points.

In step S514, the CPU 204 assigns a screen ID to each of the division screens assuming the screen ID of the original screen as a parent ID. To simplify descriptions, descriptions will be made centering on a case where the screen 805 having the screen ID 0 illustrated in FIG. 8 is divided into the screen 806 having the screen ID 1 and the screen 807 having the screen ID 2.

In step S515, the CPU 204 displays a dividing line.

The flowchart illustrated in FIG. 5A will be described below again. In step S502, the CPU 204 generates a reference image containing a point $r_n$ which has not been moved. The reference image is a portion corresponding to the image 1005 illustrated in FIG. 10. This portion corresponds to the screen 807 having the screen ID 2 illustrated in FIG. 8. An image pre-displayed in an area (an area of the screen 807 having the screen ID 2 after screen division) where the finger 1002 exists is a reference image. The generated reference image is stored in the RAM 210.

In step S503, the CPU 204 displays the reference image stored in the RAM 210 in the division screen containing the point $r_n$ (in this example, the screen 807 having the screen ID 2) out of the division screens.

In step S504, the CPU 204 executes processing for enlarging the pinched-out image. This processing is illustrated by the flowchart illustrated in FIG. 5C.

In step S516, the CPU 204 calculates a midpoint of pinch-out. Since a midpoint $m_n$ of pinch-out is a midpoint of the coordinate $(p_n, q_n)$ after movement of the coordinate, it is calculated by the following formula (2).

$$m_n = (p_n + q_n)/2 \qquad (2)$$

In step S517, the CPU 204 generates an enlarged image centering on the midpoint $m_n$, and temporarily stores it in the RAM 210.

In step S518, the CPU 204 displays the enlarged image stored in the RAM 210 in the division screen not containing the point $r_n$ (in this example, the screen 806 having the screen ID 1) out of the division screens.

Procedures for specifying a reference image and an enlarged image from actual image data and then storing them in the RAM 210 will be described below with reference to FIG. 6.

Figure 6:
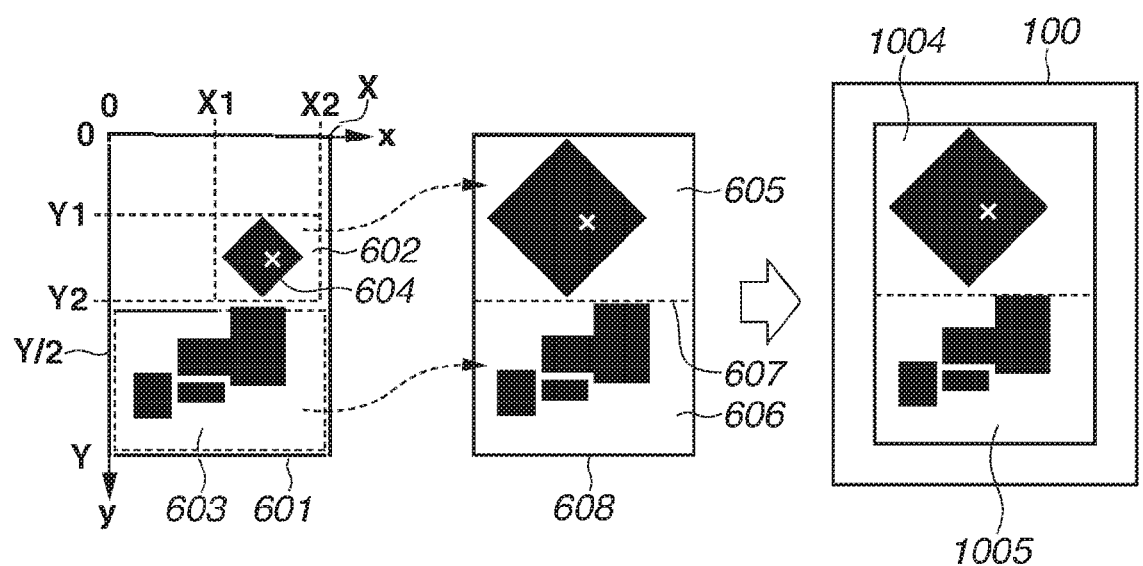
FIG. 6 illustrates a correspondence between actual image data, data on memory, and display screen.

FIG. 6 illustrates a correspondence between actual image data, data on memory, and display screen. An area 601 indicates the entire actual image data and an x-y coordinate set to the actual image. The actual image data is stored in the RAM 210. A memory area 608 used for image editing is reserved in the RAM 210. The above-described enlarged image and reference image are stored once as one piece of image data to be drawn in the memory area 608. The image data stored in the memory area 608 is transferred to a graphic image area (not illustrated) of the DISPC 207, and then drawn on the LCD 201. Referring to FIG. 6, processing will be described in association with the display image illustrated in FIG. 10.

An area 602 surrounded by dotted lines of a rectangle having four corner coordinates (X1, Y1), (X2, Y1), (X2, Y2), and (X1, Y2) out of the entire image 601 is displayed as an enlarged image. The above-described pinch-out has a center 604. Based on information about the distance of pinch-out, the CPU 204 determines a magnification and coordinates of the area 602 to be displayed as an enlarged image. At this timing, the CPU 204 recognizes the center 604 of pinch-out as the center of the area 602. Then, the CPU 204 generates an enlarged image from the determined area, and stores the enlarged image in an area 605 (for storing an enlarged image) included in the memory area 608. The CPU 204 enlarges an image so that the top left corner of the area 605 corresponds to the top left corner (X1, Y1) of the area 602, and the bottom right corner of the area 605 corresponds to the bottom right corner (X2, Y2) of the area 602.

An area 603 surrounded by dotted lines of a rectangle having four corner coordinates (0, Y/2), (Y/2, X), (X, Y), and (0, Y) out of the entire image 601 is displayed as a reference image. The CPU 204 generates a reference image from the area 603 containing a point pressed down by the finger 1002 illustrated in FIG. 10, and stores the reference image in an area 606 (for storing a reference image) included in the memory area 608. The RAM 210 stores coordinate information of the enlarged image and reference image with respect to the entire image. A line 607 indicates a dividing line. The memory area 608 is updated each time an event specifying the scrolling, zooming, etc. of an image occurs.

The flowchart illustrated in FIG. 5A will be described below again.

In step S505, the CPU 204 determines whether a finger is detached from (whether touch-up is detected) at least either one of the three points ($p_n$, $q_n$, and $r_n$). When a finger is detached (YES in step S505), the processing proceeds to step S522. Otherwise (NO in step S505), the processing proceeds to step S506.

In step S522, similar to step S309 illustrated in FIG. 3, the CPU 204 reduces the number of fingers touching the touch panel 202 by a number of detected portions of touch-up. Upon completion of step S522, the processing exits the flowchart illustrated in FIG. 5A.

In step S506, the CPU 204 determines whether a touch input event (move) meaning finger movement has occurred. If a touch input event has occurred (YES in step S506), the processing proceeds to step S507. Otherwise (NO in step S506), the processing returns to step S505.

In step S507, the CPU 204 determines whether at least either one of ($p_n$, $q_n$) is contained in the moved point. When at least either one of ($p_n$, $q_n$) is contained (YES in step S507), the processing proceeds to step S508. Otherwise (NO in step S507), the processing proceeds to step S509.

Figure 5D:
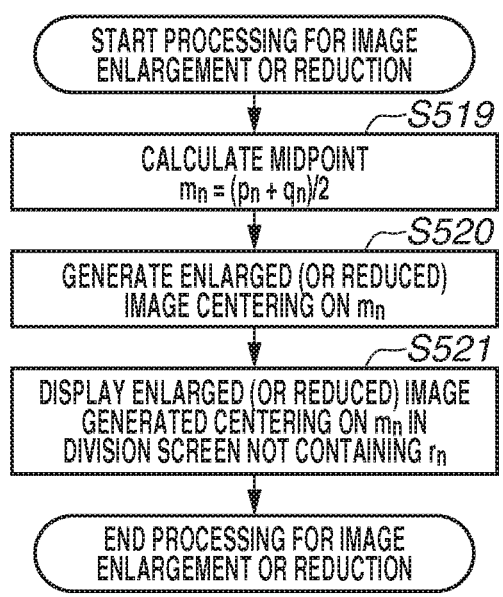
FIG. 5D is a flowchart illustrating the processing for dividing the screen into two and displaying an enlarged image on one of the two screens.

In step S508, the CPU 204 executes processing for enlarging or reducing an image centering on the coordinate of the midpoint of ($p_n$, $q_n$). This processing is illustrated in FIG. 5D.

In step S519, similar to step S516, the CPU 204 calculates a midpoint $m_n$ of the coordinate ($p_n$, $q_n$) of a moved finger. $m_n$ is calculated by the above-described formula (2).

In step S520, the CPU 204 determines whether finger movement has occurred due to pinch-out, by using the formula (1). When finger movement has occurred due to pinch-out, the CPU 204 generates an enlarged image centering on the midpoint $m_n$. When finger movement has occurred due to pinch-in, not pinch-out, the CPU 204 generates a reduced image centering on the midpoint $m_n$. The generated image is temporarily stored in the RAM 210.

In step S521, similar to step S518, the CPU 204 displays in the screen 806 having the screen ID 1 the enlarged image or reduced image stored in the RAM 210. Upon completion of step S508, the processing proceeds to step S509.

In step S509, the CPU 204 determines whether the point $r_n$ is contained in the moved point. When the point $r_n$ is contained in the moved point (YES in step S509), the processing proceeds to step S510. Otherwise (NO in step S509), the processing returns to step S505.

In step S510, the CPU 204 scrolls the image displayed in the screen 807 having the screen ID 2 containing the point $r_n$ to follow the movement of the point $r_n$. Upon completion of this processing, the processing returns to step S505.

Processing from step S505 to step S510 is executed in loop form, i.e., the CPU 204 repeats this loop until a finger is detached from at least either one of the three points ($p_n$, $q_n$, and $r_n$). Thus, pinch-out, pinch-in, scrolling, and other operations become possible for each screen which has been divided and enlarged for image display.

Figure 11:
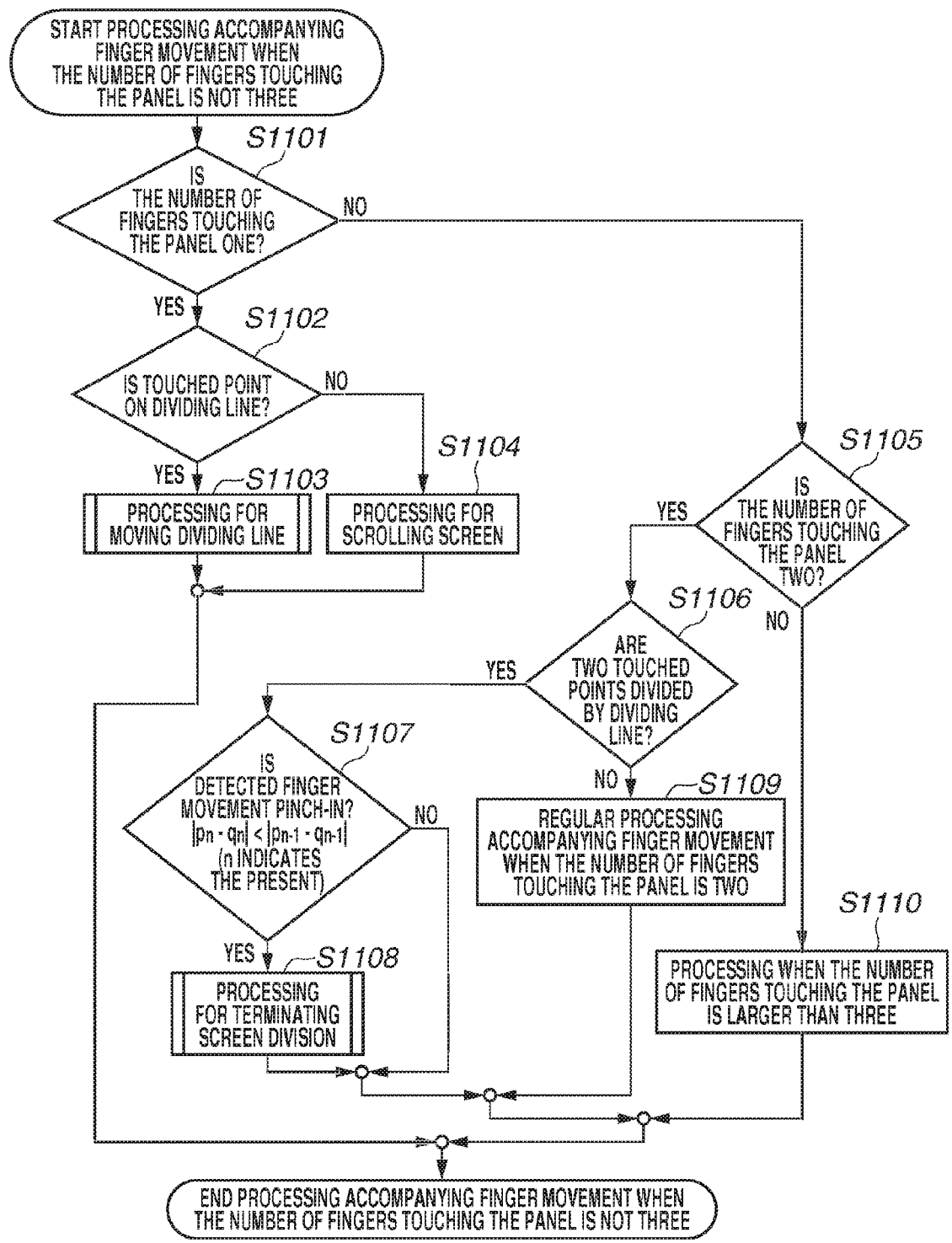
FIG. 11 is a flowchart illustrating processing accompanying finger movement when the number of finger points is not three.

FIG. 11 is a flowchart illustrating processing performed by the information processing apparatus 100, accompanying finger movement in a case where the number of fingers which are touching the touch panel 202 is not three. This flowchart is executed in step S409 of the flowchart illustrated in FIG. 4.

In step S1101, the CPU 204 determines whether the number of fingers touching the touch panel 202 (the number of portions at which touch-on is detected) is one. When the number of fingers touching the touch panel 202 is one (YES in step S1101), the processing proceeds to step S1102. Otherwise (NO in step S1101), the processing proceeds to step S1105.

In step S1102, the CPU 204 determines whether the touched point is on a dividing line in the screen. When the touched point is on a dividing line (YES in step S1102), the processing proceeds to step S1103. Otherwise (NO in step S1102), the processing proceeds to step S1104. When determining whether the point is on a dividing line, the CPU 204 does not necessarily make an accurate determination but tolerate a certain shift of the point. Specifically, the CPU 204 may determine that the point is on a dividing line as long as a difference between the coordinate of the dividing line and the coordinate of the point is less than a predetermined amount.

In step S1103, the CPU 204 executes processing for moving the dividing line. This processing will be described below with reference to FIGS. 12A and 12B.

In step S1104, the CPU 204 executes processing for scrolling the screen containing the finger which is touching the touch panel 202. This processing is executed on a division screen basis when screen division is made.

In step S1105, the CPU 204 determines whether the number of fingers touching the touch panel 202 is two. When the number of fingers touching the touch panel 202 is two (YES in step S1105), the processing proceeds to step S1106. Otherwise (NO in step S1105), the processing proceeds to step S1110.

In step S1106, the CPU 204 determines whether the two touched points are striding over a dividing line. When the two touched points are striding over a dividing line (YES in step S1106), the processing proceeds to step S1107. Otherwise (NO in step S1106), the processing proceeds to step S1109.

In step S1107, the CPU 204 determines whether the detected finger movement is a pinch-in. When the detected finger movement is a pinch-in (YES in step S1107), the processing proceeds to step S1108. When determining whether the detected finger movement is a pinch-in, the inequality sign in the formula (1) may be reversed. Otherwise, when the detected finger movement is determined not to be pinch-in, i.e., when the detected finger movement is a pinch-out (NO in step S1107), the processing exits the flowchart without processing the screen. However, when a pinch-out is performed over a dividing line, the two screens touched by respective fingers may be scrolled in the same direction of the movement of respective fingers.

In step S1108, the CPU 204 executes processing for terminating screen division. This processing will be described in detail below with reference to FIG. 13. Upon completion of step S1108, the processing exits the flowchart.

In step S1109, out of processing accompanying finger movement when the number of fingers touching the touch panel 202 is two, the CPU 204 executes the processing in a case where the two touched points are not striding over a dividing line. Since this is a gesture of regular pinch-out or pinch-in, the CPU 204 executes processing for enlarging or reducing an image. This processing is executed on a division screen basis when screen division is made.

In step S1110, the CPU 204 executes processing accompanying finger movement when the number of fingers touching the touch panel 202 is larger than three, i.e., when touch-on is detected at four or more points. Since processing in this case is not directly related to the present invention, detailed descriptions will be omitted.

Upon completion of processing in steps S1109 and S1110, the processing exits the flowchart illustrated in FIG. 11.

FIGS. 12A and 12B are flowchart illustrating processing for moving a dividing line performed by the information processing apparatus 100. This flowchart is executed in step S1103 of the flowchart illustrated in FIG. 11.

To simply descriptions, it is assumed that screen division is made as illustrated in FIG. 10, where an enlarged image is displayed in a division screen having the screen ID 1, a reference image is displayed in a division screen having the screen ID 2, and the parent ID thereof is the screen ID 0.

In step S1201, the CPU 204 executes processing for moving a dividing line. This processing is illustrated by the flowchart illustrated in FIG. 12B.

In step S1207, the CPU 204 calculates a component 1 of the distance of finger movement in a direction perpendicular to the dividing line, by using the following formula (3).

$$1=|s_n-s_{n-1}| \quad (3)$$

where $s_n$ indicates coordinate information for a point at which a finger is positioned after it has moved on the dividing line.

In step S1208, the CPU 204 detects a moving direction of the point $s_n$ in a direction perpendicular to the dividing line.

In step S1209, the CPU 204 enlarges (or reduces) the display area of the enlarged image displayed on the division screen having the screen ID 1 according to the finger's moving direction, generates a new enlarged image, and instructs the DISPC 207 to display the enlarged image. The DISPC 207 instructs the LCD 201 to display the enlarged image with the enlarged (reduced) display area.

In step S1210, the CPU 204 reduces (or enlarges) the display area of the reference image displayed on the division screen having the screen ID 2 according to the finger's moving direction, and generates a new reference image. Then, the DISPC 207 instructs the LCD 201 to display the new reference image similar to the enlarged image.

In step S1211, the CPU 204 moves the dividing line by the component 1 in the detected moving direction.

Then, the processing returns to the flowchart illustrated in FIG. 12A. In step S1202, the CPU 204 determines whether the finger on the dividing line has been detached from the point $s_n$, i.e., whether a touch-up is detected. When the finger has been detached (YES in step S1202), the processing exits this flowchart. Otherwise (NO in step S1202), the processing proceeds to step S1203.

In step S1203, the CPU 204 determines whether a touch input event indicating finger movement has occurred. When a touch input event indicating finger movement has occurred (YES in step S1203), the processing proceeds to step S1204. Otherwise (NO in step S1203), the processing returns to step S1202.

In step S1204, the CPU 204 determines whether the moved point is the point $s_n$. When the moved point is the point $s_n$ (YES in step S1204), the processing proceeds to step S1205. Otherwise (NO in step S1204), the processing returns to step S1202. In step S1205, the CPU 204 executes processing for moving the dividing line illustrated in FIG. 5B. Upon completion of the processing in step S1205, the processing returns to step S1202.

Since the processing in steps S1202 to S1205 is repetitively executed until a touch-up is performed at the point $s_n$ on the dividing line, the dividing line can be moved following the finger movement on the dividing line.

Figure 14:
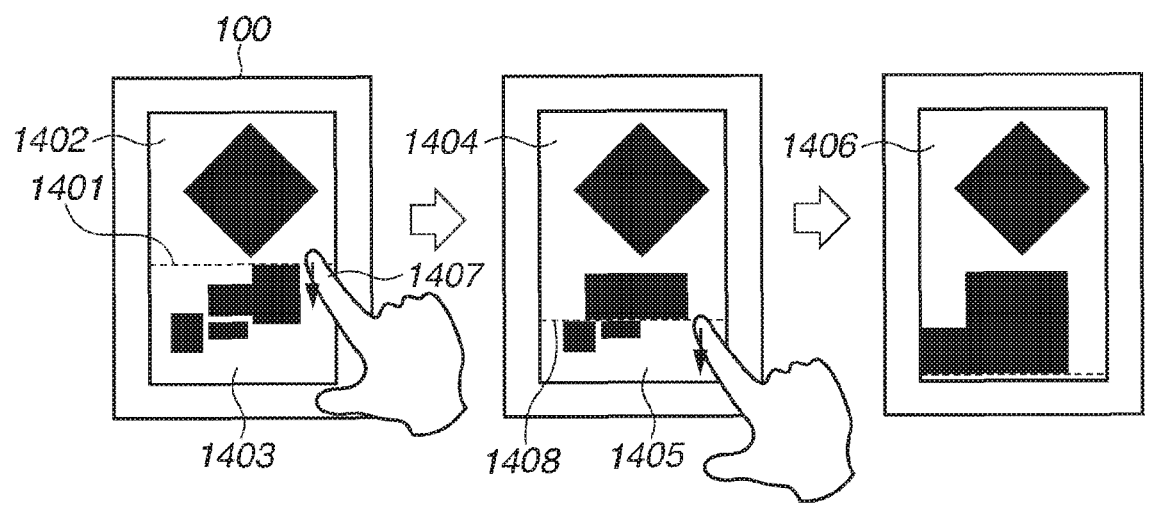
FIG. 14 schematically illustrates a state where a dividing line is moved.

FIG. 14 schematically illustrates a state where the dividing line is moved.

In the example illustrated in FIG. 14, on the information processing apparatus 100, a screen 1402 having the screen ID 1 and a screen 1403 having the screen ID 2 are divided by a dividing line 1401. When the user performs a touch-down on the dividing line 1401 and then slides it in the downward direction with a finger 1407, the dividing line 1401 downwardly moves following the finger movement, as illustrated by the dividing line 1408. Accordingly, the display area of a screen 1404 having the screen ID 1 displaying the enlarged image is accordingly enlarged. When the user moves the finger 1407 all the way to the bottom, the enlarged image is displayed in an entire screen 1406 having the screen ID 1.

Conversely, when the user slides the dividing line 1401 in the upward direction, the display area of a screen 1405 having the screen ID 2 displaying the reference image is accordingly enlarged. Thus, in the present exemplary embodiment, by sliding a dividing line which is a boundary between two division screens, each division screen can be resized.

Processing for terminating screen division will be described below with reference to FIGS. 13, and 15 to 18.

Figure 16:
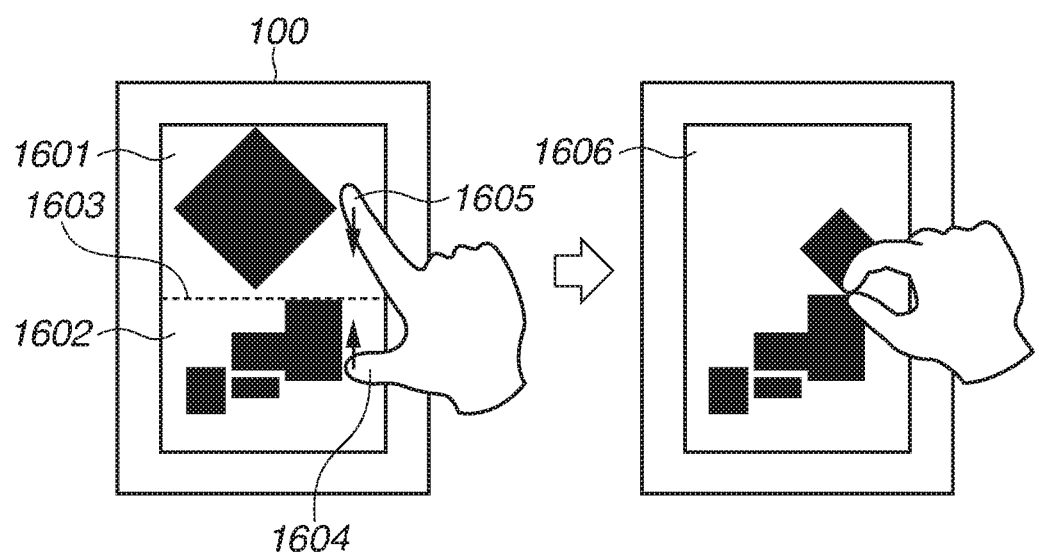
FIG. 16 illustrates an example of a state where screen division is ended.

FIG. 16 schematically illustrates a state where a pinch-in is performed on division screens to restore them to the original screen before screen division. Referring to FIG. 16, out of two division screens, a finger 1605 touches on the division screen of an enlarged image 1601, and a finger 1604 touches on the division screen of a reference image 1602. When the user performs a pinch-in with the fingers 1604 and 1605 (brings them close to a dividing line 1603), screen division is terminated and a display screen 1606 appears displaying the reference image.

Figure 15A:
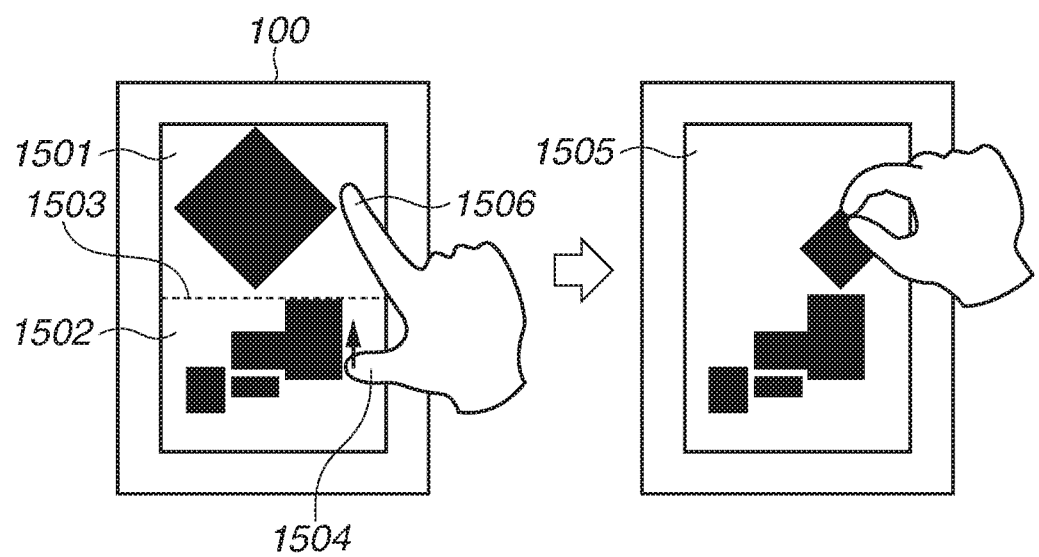
FIG. 15A illustrates examples of states where screen division is ended.
Figure 15B:
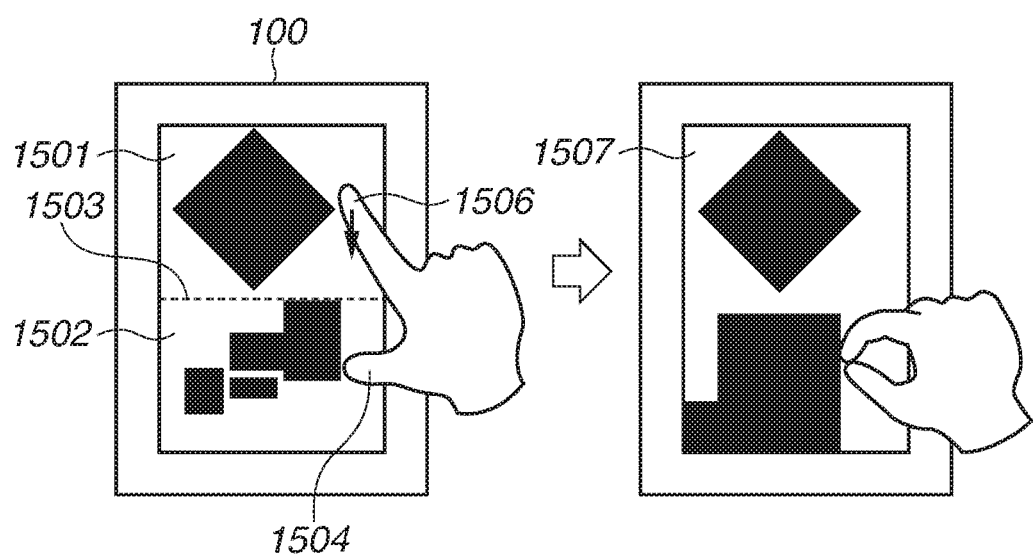
FIG. 15B illustrates examples of states where screen division is ended.

When screen division is terminated, there may be a case where the user wants to select one of the enlarged image and the reference image to be retained instead of displaying the image before screen division (the reference image). FIGS. 15A and 15B illustrate methods for selecting the enlarged image or the reference image to be displayed in the screen after termination of screen division. In this case, the user fixes either finger on the screen when screen division is terminated with pinch-in. When division screens 1501 and 1502 divided by a dividing line 1503 are displayed as illustrated in FIG. 15A, if an index finger 1506 is fixed and a thumb 1504 is moved in the upward direction, a reference image 1502 having the screen ID 2 is displayed on an entire screen 1505 after termination of screen division.

Conversely, as illustrated in FIG. 15B, if the thumb 1504 is fixed and the index finger 1506 is moved in the downward direction, the enlarged image 1501 having the screen ID 1 is displayed on an entire screen 1507 after termination of screen division. Specifically, this method selects the image displayed in the screen in which a moved finger was placed, as an image to be displayed after termination of screen division. In contrast to this processing, it may also be possible to select the image displayed in the screen in which a finger was fixed, as an image to be displayed after termination of screen division.

FIGS. 15A, 15B, and 16 describe processing for terminating screen division centering on a case where a screen having the screen ID 0 is divided into a screen having the screen ID 1 displaying an enlarged image and a screen having the screen ID 2 displaying a reference image.

FIG. 13 is a flowchart illustrating processing for terminating screen division performed by the information processing apparatus 100. This flowchart is executed in step S1108 of the flowchart illustrated in FIG. 11.

In step S1301, the CPU 204 acquires screen IDs of each screen containing relevant two points. In the examples illustrated in FIGS. 15A, 15B, and 16, screen IDs of the screens containing the two points are the screen ID 1 and the screen ID 2. In the example illustrated in FIGS. 17A to 17D, screen IDs of the screens containing the two points are the screen ID 3 and a screen ID 6. In the example illustrated in FIGS. 18A to 18E, screen IDs of the screens containing the two points are a screen ID 5 and a screen ID 8.

In step S1302, the CPU 204 traces screen IDs of the screens containing the two acquired points until a common parent screen ID is found, thus identifying a relevant parent ID. In the case of the examples in FIGS. 15A, 15B, and 16, the common parent ID is the screen ID 0. FIGS. 17A to 17D and 18A to 18E schematically illustrate how tracing IDs is performed.

FIGS. 17A to 17D and 18A to 18E schematically illustrate examples of methods for managing screens when terminating screen division, based on the screen ID.

Figure 17A:
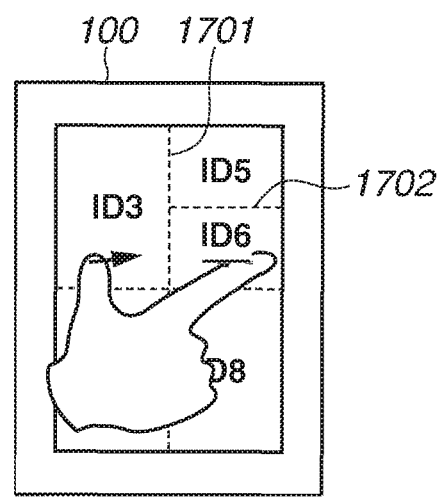
FIG. 17A illustrates an example of screen management methods when screen ID-based screen division is ended.
Figure 17B:
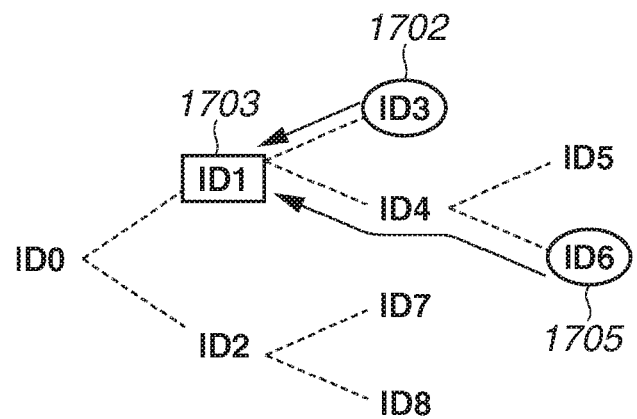
FIG. 17B illustrates an example of screen management methods when screen ID-based screen division is ended.
Figure 17C:
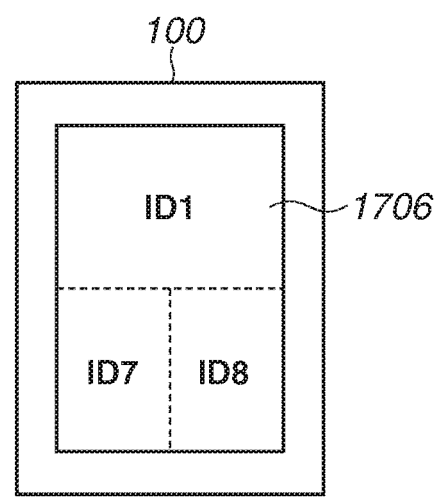
FIG. 17C illustrates an example of screen management methods when screen ID-based screen division is ended.

Referring to FIG. 17B, when the CPU 204 traces screen IDs of a node 1704 having the screen ID 3 and a node 1705 having the screen ID 6, a node 1703 having the screen ID 1 is identified as a common parent node.

Figure 18A:
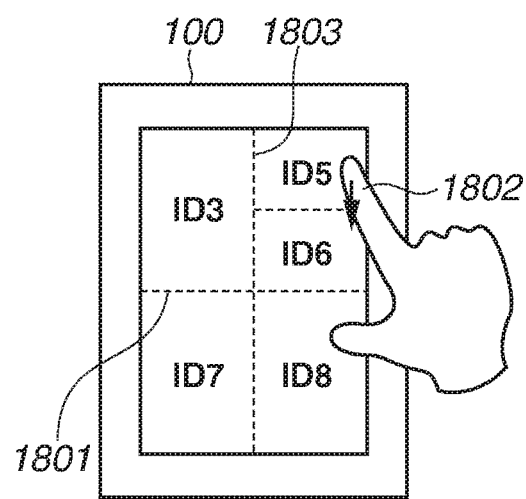
FIG. 18A illustrates an example of screen management methods when screen ID-based screen division is ended.
Figure 18B:
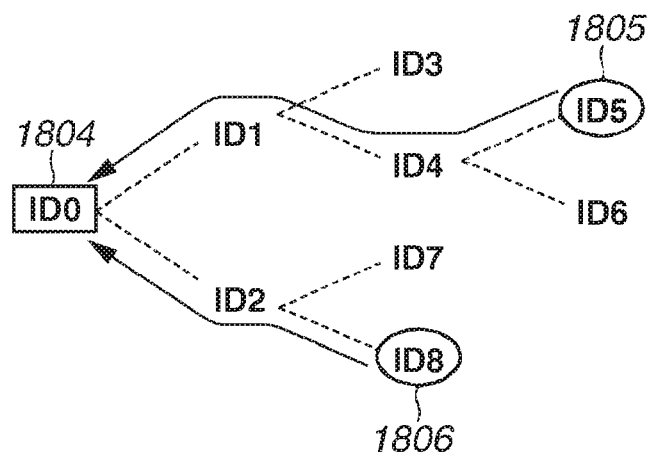
FIG. 18B illustrates an example of screen management methods when screen ID-based screen division is ended.

Likewise, referring to FIG. 18B, when the CPU 204 traces screen IDs of a node 1805 having the screen ID 5 and a node 1806 having the screen ID 8, a node 1804 having the screen ID 0 is identified as a common parent node.

In step S1303, the CPU 204 deletes the dividing line which divides the screen having the parent ID identified in step S1302. In the example illustrated in FIG. 17A, dividing lines 1701 and 1702 will be deleted. In the example illustrated in FIG. 18B, dividing lines 1801 and 1803 will be deleted.

In step S1304, the CPU 204 determines whether the number of moved points is one. When the number of moved points is one (YES in step S1304), the processing proceeds to step S1305. Otherwise (NO in step S1304), the processing moves to step S1306.

In step S1305, the CPU 204 displays the division screen containing the moved point related to the dividing line which divides the screen having the parent ID identified in step S1302, in the screen having the parent ID. Specifically, FIGS. 15A, 15B, and 18A to 18E correspond to this case. Referring to FIGS. 15A and 15B, the screen 1502 having the screen ID 2 or the screen 1501 having the screen ID 1 is displayed in the entire screens 1505 and 1507, respectively, instead of the screen having the common parent ID 0. Referring to FIG. 18A, the dividing line 1801 dividing the screen having the screen ID 0, and the dividing line 1803 dividing the screen having the screen ID 2 are deleted. Of the division screens divided by the dividing line 1801, the screen on which a finger 1802 is placed is a screen 1807 having the screen ID 1.

Figure 18C:
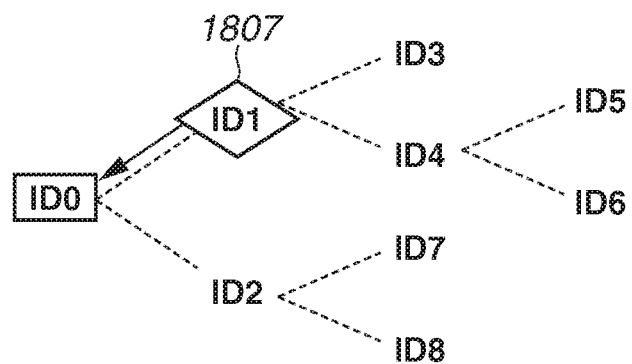
FIG. 18C illustrates an example of screen management methods when screen ID-based screen division is ended.
Figure 18D:
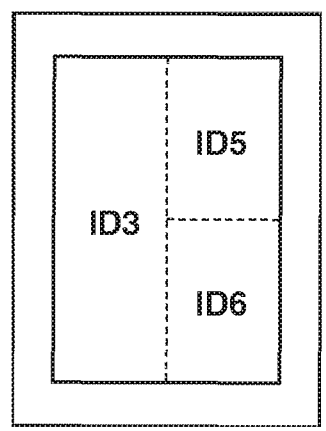
FIG. 18D illustrates an example of screen management methods when screen ID-based screen division is ended.
Figure 18E:
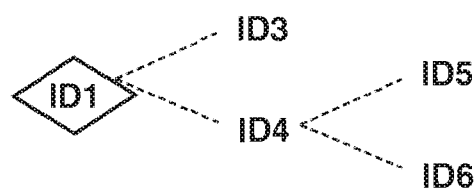
FIG. 18E illustrates an example of screen management methods when screen ID-based screen division is ended.

Specifically, since the screens having the screen ID 3, the screen ID 5, and the screen ID 6 will be displayed in the entire screen, it is preferable to substitute the node 1807 having the screen ID 1 for the node 1809 having the screen ID 0. FIG. 18C illustrates how they are substituted. FIG. 18E illustrates a state of the binary tree after the substitution. Thus, screens are displayed as illustrated in FIG. 18D. In this case, it is also possible to exchange the vertical and horizontal directions of the information processing apparatus 100.

Figure 17D:
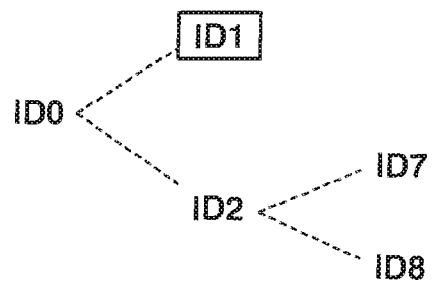
FIG. 17D illustrates an example of screen management methods when screen ID-based screen division is ended.

Processing in step S1306 is executed when the number of moved points is two. In step S1306, the CPU 204 displays the screen having the parent ID identified in step S1302. Specifically, FIGS. 16 and 17A to 17D correspond to this case. In the case illustrated in FIG. 16, the CPU 204 displays the screen having the screen ID 0 before screen division. Referring to FIG. 17B, when the CPU 204 traces screen IDs of the node 1705 having the screen ID 6 and the node 1704 having the screen ID 3, a node 1703 having the screen ID 1 is identified as a common parent node. Then, as illustrated in FIG. 17D, the CPU 204 deletes nodes placed under the node having the screen ID 1, and displays the screen having the screen ID 1. The screen 1706 illustrated in FIG. 17C indicates that state.

By repetitively executing the above processing, processing for dividing a screen and displaying an enlarged image in one division screen, and processing for restoring division screens to the original screen can be implemented.

As described above, the present exemplary embodiment enables displaying an enlarged image while holding the display of the original image before enlargement, thus the two images can be displayed on a display unit at the same time. Therefore, the user can check the original image before enlargement together with the enlarged image. Since images are displayed in division screens independently of each other, the user can also perform further enlargement/reduction and sliding operations for each image (enlarged image and reference image). In addition, the user can combine division screens into one screen (restore division screens to the original screen) through a pinch-in operation.

The present exemplary embodiment has specifically been described based on a case where a displayed image is touched on three points and, while fixing one of the three points, a pinch-out is performed with the remaining two points to enlarge the image. However, instead of the pinch-out operation, a pinch-in operation may be performed to execute the same processing. Specifically, it is also possible that a displayed image is touched on three points and, while fixing one of the three points, a pinch-in is performed with the remaining two points to reduce the image. Also in this case, similar to the present exemplary embodiment, the screen is divided into a screen displaying a reduced image (instead of an enlarged image) and a screen displaying a reference image. By displaying side by side the reduced image and the original image (image in the original size), the user can check information in a wide range which is not displayed in the original image.

As described above, according to the present exemplary embodiment, operability of display control of images displayed on the display unit of an information processing apparatus having a touch panel can be remarkably improved.

OTHER EMBODIMENTS

The information processing apparatus according to the present invention includes various types of apparatuses, for example, not only personal computers, personal digital assistants (PDAs), and cellular phones but also printers, scanners, facsimiles, copying machines, multifunction peripherals, cameras, video cameras, and other image viewers.

Further, in the above-described first exemplary embodiment, image data such as photographic and graphical data is subjected to display control operations. However, data types applicable to the present invention is not limited thereto. For example, when an image forming apparatus such as a digital multifunction peripheral is used as the information processing apparatus 100, similar processing to the above-described first exemplary embodiment is also applicable to a print job list screen for displaying a list of print jobs operable in the digital multifunction peripheral.

If the above-described processing is applied to the job list screen, an enlarged image for displaying detailed information of each job displayed in list form and a reference image displaying the entire list can be displayed side by side, allowing the user to view these images at the same time.

Figure 7:
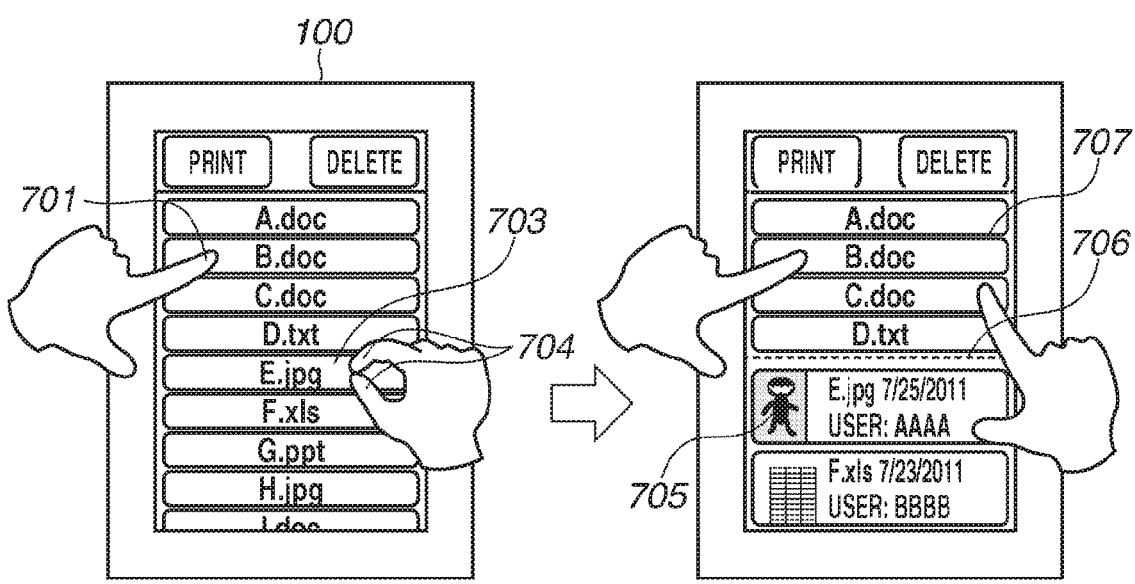
FIG. 7 illustrates dividing and enlargement on a printing job list screen.

FIG. 7 schematically illustrates a state where the user touches three different points on the printing job list screen and, while fixing one of the three points, performs a pinch-out operation with the remaining two points. Similar to FIG. 10, in a touch-on state of a finger 701, the user performs a pinch-out with two fingers 704 on the portion of a print job 703 ("E.jpg"). As a result, the screen is divided by a dividing line 706 as illustrated on the right-hand side of FIG. 7. A division screen 705, corresponding to the enlarged image 1004 illustrated in FIG. 10, displays detailed information about print jobs (for example, "E.jpg" and "F.xls") below the print job 703 to which a pinch-out was applied.

It is also possible that the division screen 705 displays detailed information about the print job "E.jpg" touched by two fingers 704 and the subsequent print jobs are displayed in a list form. The detailed information may include thumbnail images, date and time of job transmission, user name, and other information. The other screen 707, corresponding to the reference image screen 1005 illustrated in FIG. 10, displays in the original size a job list including the job held by the finger 701.

In the above-described first exemplary embodiment, when the user touches three different points and, while fixing one of the three points, and moves the remaining two points, the above-described image enlargement (or reduction) and screen division are performed. However, it is also possible that the above-described image enlargement (or reduction) and screen division are performed when the user touches four or more different points and, while fixing one of the four or more points, and moves the remaining three or more points. In other words, the present invention is not limited to a case where three points are touched.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
at least one processor coupled to at least one memory, the at least one processor being programmed to perform division and enlargement processing, and
display an image;
detect a touch of at least three points;
detect an operation in which three different points on the displayed image are touched and, while fixing one of the three points, a pinch-out is performed with the remaining two points; and
in response to detection, perform control to display a first display image which is a partial image of the image and is an enlarged partial image including at least the center of the pinch-out, and a second display image which is a partial image of the image and is an unenlarged partial image including at least the one fixed point,
wherein the control displays side by side the first display image and the second display image.

2. The information processing apparatus according to claim 1, wherein the at least one processor is further programmed to, in response to the detection, divide a display screen displaying the image into a first screen for displaying the first display image and a second screen for displaying the second display image, and
wherein the first and second display images are displayed respectively in the divided first and second screens.

3. The information processing apparatus according to claim 2, wherein, after a screen is divided, in response to a scroll operation with a touch on the first screen, the first display image is scrolled while the second display image is not.

4. The information processing apparatus according to claim 2, wherein, after a screen is divided, in response to a pinch-out operation on the first screen, the first display image is enlarged while the second display image is not.

5. The information processing apparatus according to claim 2, wherein the at least one processor is further programmed to, in response to an operation in which a dividing line indicating a boundary between the divided first and second screens is touched and slid, change the sizes of the first screen and the second screen.

6. The information processing apparatus according to claim 2, wherein the at least one processor is further programmed to, in response to a pinch-in operation with two points touched over a dividing line indicating a boundary between the divided first and second screens, delete at least either one of the first screen and the second screen to display one screen.

7. The information processing apparatus according to claim 2, wherein the at least one processor is further programmed to, upon execution of a pinch-in operation while fixing one point on the first screen out of the two points touched over a dividing line indicating a boundary between the divided first and second screens, delete the first screen to display one screen based on the second screen.

8. The information processing apparatus according to claim 2, wherein the at least one processor is further programmed to, upon execution of a pinch-in operation while fixing one point on the second screen out of the two points touched over a dividing line indicating a boundary between the divided first and second screens, delete the second screen to display one screen based on the first screen.

9. The information processing apparatus according to claim 1, wherein the first display image includes detailed information about the image.

10. An information processing apparatus to perform division and enlargement processing, the information processing apparatus comprising:
at least one processor coupled to at least one memory, the at least one processor being programmed to
display an image;
detect a touch;
detect an operation in which, while fixing one touched point on the displayed image, a touch for enlarging the image is performed;
in response to detection, divide a display screen displaying the image into a first screen and a second screen; and
display in the first screen a first image enlarged in response to the touch for enlarging the image, and display in the second screen a second image which is an unenlarged image including at least the one fixed point.

11. A method for controlling display of an image displayed on a display unit of an information processing apparatus that performs division and enlargement processing, the method comprising:
detecting an operation in which three different points on the image displayed on the display unit are touched and, while fixing one of the three points, a pinch-out is performed with the remaining two points; and performing control for displaying on the display unit a first display image which is a partial and enlarged image of the image including at least the center of the pinch-out, and a second display image which is a partial and unenlarged image of the image including at least the one fixed point, wherein the control displays side by side the first display image and the second display image.

12. A non-transitory computer-executable program for controlling display of an image displayed on a display unit of an information processing apparatus that performs division and enlargement processing according to a method comprising:

detecting an operation in which three different points on the image displayed on the display unit are touched and, while fixing one of the three points, a pinch-out is performed with the remaining two points; and performing control for displaying on the display unit a first display image which is a partial and enlarged image of the image including at least the center of the pinch-out, and a second display image which is a partial and unenlarged image of the image including at least the one fixed point, wherein the control displays side by side the first display image and the second display image.

* * * * *